US009240946B2

(12) United States Patent
Cai et al.

(10) Patent No.: US 9,240,946 B2
(45) Date of Patent: Jan. 19, 2016

(54) MESSAGE RESTRICTION FOR DIAMETER SERVERS (75) Inventors: Yigang Cai, Naperville, IL (US); Xiangyang Li, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 227 days.

(21) Appl. No.: 12/988,062

(22) PCT Filed: May 1, 2008

(86) PCT No.: PCT/US2008/062257
§ 371 (c)(1),
(2), (4) Date: Oct. 15, 2010

(87) PCT Pub. No.: WO2009/134265
PCT Pub. Date: Nov. 5, 2009

(65) Prior Publication Data
US 2011/0040845 A1  Feb. 17, 2011

(51) Int. Cl.
*G06F 15/16* (2006.01)
*H04L 12/801* (2013.01)
*H04L 12/825* (2013.01)
(Continued)

(52) U.S. Cl.
CPC ............... *H04L 47/10* (2013.01); *H04L 47/18* (2013.01); *H04L 47/263* (2013.01); *H04L 63/0892* (2013.01); *H04L 63/10* (2013.01); *H04L 67/1002* (2013.01); *H04L 69/40* (2013.01); *H04L 67/101* (2013.01); *H04L 67/1008* (2013.01); *H04L 67/1036* (2013.01)

(58) Field of Classification Search
CPC ....... H04L 47/10; H04L 47/18; H04L 47/263; H04L 69/40; H04L 67/1008; H04L 67/1036
See application file for complete search history.

(56) References Cited

U.S. PATENT DOCUMENTS 6,064,892 A * 5/2000 Miyagawa et al. ........... 455/560
7,046,627 B1 * 5/2006 Dejanovic et al. ............ 370/230
(Continued)

FOREIGN PATENT DOCUMENTS

CN   1889563     *  1/2007
CN   1889563 A   *  1/2007

OTHER PUBLICATIONS

Calhoun et al, Diameter base protocol ( RFC 3588).*
(Continued)

*Primary Examiner* — Joshua Joo
*Assistant Examiner* — Younes Naji
(74) *Attorney, Agent, or Firm* — Duft Bornsen & Fettig, LLP (57) ABSTRACT

Communication networks and methods are disclosed for providing a message restriction process used to control the transmission of Diameter messages. The communication network includes a Diameter server operable to serve a plurality of Diameter clients. The Diameter server detects a triggering event for initiating the message restriction process, such as detecting an overload condition. The Diameter server then generates control information that defines the Diameter messages that the Diameter clients are authorized to transmit during the message restriction process. The Diameter server generates a message restriction instruction that includes the control information, and transmits the message restriction instruction to one or more of the Diameter clients to initiate the message restriction process based on the control information.

16 Claims, 5 Drawing Sheets

(51) Int. Cl.
*H04L 29/06* (2006.01)
*H04L 29/14* (2006.01)
*H04L 29/08* (2006.01)

(56) References Cited

U.S. PATENT DOCUMENTS

| | | | | |
|---|---|---|---|---|
| 2002/0152319 | A1* | 10/2002 | Amin et al. | 709/232 |
| 2008/0219167 | A1* | 9/2008 | Xu et al. | 370/237 |
| 2011/0191482 | A1* | 8/2011 | Przybysz et al. | 709/228 |
| 2012/0131639 | A1* | 5/2012 | Alex et al. | 726/3 |

OTHER PUBLICATIONS

P.Calhoun et al "Diameter Base Protocol ", RC 3588 Sep. 2003.*
Network Working Group RFC—3588—P. Calhoun et al. "Diameter Base Protocol" Sep. 2003.*
Whitehead M; GOCAP—one standardised overload control for next generation networks,: BT Technology Journal, Kluwer Academic Publishers, DO, vol. 23, No. 1, Jan. 1, 2005, pp. 147-153, XP019218797 ISSN: 1573-1995, all pages.
Calhoun et al; Diameter Base Protocol; rfc3588.tex: IETF Standard, Internet Engineer Task Force, IETF, CH, Sep. 1, 2003, XP015009370 ISSN: 0000-0003, all page.
British Telecommunications PLC Ian Jenkins; "NGN Control Plane Overload and its Management," Multiserviceforum MSF Technical Report, [Online] Feb. 2006, pp. 1-11, XP002528783, www.msforum. org, retrieved from the Internet: URL: http//www.msforum.org/techinfo/reports/MSF-TR-ARCH-007-Final.pdf, [retrieved on May 19, 2009] all pages.
"TIPSPAN; Next Generation Networks; Architecture for Control of Processing Overload; ETSI DTR/TISPAN-WI02026-NGN" ETSI Standards, LIS, Sophia Antipolis Cedex, France, No. V0.0.6c, Feb. 1, 2006, XP014133752, issn: 0000-0001; all pages.

* cited by examiner

MESSAGE RESTRICTION FOR DIAMETER SERVERS

RELATED APPLICATIONS

This application is the National Stage under 35 U.S.C. 371 of International Application No. PCT/US08/62257, filed May 1, 2008, which is incorporated by reference herein.

BACKGROUND OF THE INVENTION

1. Field of the Invention

The invention is related to the field of communication networks, and in particular, to implementing a message restriction process to control the transmission of messages from Diameter clients to Diameter servers.

2. Statement of the Problem

The Diameter protocol is defined by the IETF (Internet Engineering Task Force) as a base protocol intended to provide an Authentication, Authorization, and Accounting (AAA) framework for applications such as network access or IP mobility. The Diameter protocol has been used in 3GPP IMS standards for authentication, accounting, and policy management. A message in Diameter protocol includes, among other things, a version field, a message length field, a command flag field, a command code field, an application identifier field, and a plurality of Attribute Value Pairs (AVPs). There are a variety of AVPs that are defined by the IETF to provide a variety of functions.

In its most generalized form, a communication network implementing the Diameter protocol includes one or more Diameter clients that are being served by a Diameter server. A Diameter server receives Diameter Request messages from the Diameter clients, and responds to the clients with Diameter Response messages. For example, in an IMS network, a Diameter server may be represented by an Application Server (AS), a Policy Decision Function (PDF), a Resource Admission Control Subsystem (RACS), a AAA server, a Home Subscriber Server (HSS), a Charging Collector Function (CCF), a Charging Data Function (CDF), an Online Charging System (OCS), etc. A Diameter server could be one element, or multiple elements (a cluster). Any IMS network elements in an IMS network or other legacy or 2G networks may be Diameter clients which interface with the Diameter servers via Diameter protocol. A Diameter client may also be represented by a Diameter router implemented between IMS network elements and the Diameter servers.

The Diameter traffic flows in a communication network need to be controlled and balanced to guarantee system performance and reliability, including network element availability and geographical redundancy. Because a typical communication network includes a large number of Diameter servers and Diameter clients, it is presently a problem for the communication network to balance the load and traffic among the servers and clients. One traditional solution is to place load balance switches (LBS) in the communication network. The load balance switches monitor the traffic and load among all the Diameter servers, and attempt to distribute the traffic evenly among the servers. Unfortunately, the load balance switches can only distribute the traffic, but if the traffic volume is high, the Diameter servers may still get overloaded.

An overload condition in a Diameter server can cause significant problems in a communication network. When a Diameter client transmits a Diameter Request message to a Diameter server, the client sets a time interval during which the client expects to receive a Response message from the server. If the Diameter server is overloaded, then the server either will not respond to the Request message or will have a delayed response to the client. If the Diameter client does not receive a Response message within the time interval, then the Diameter client initiates a retry of the Request message. This process continues until the maximum number of retries in the client is reached. The process of having the client retry transmission of messages to the Diameter server can exacerbate the overload condition of the server by bombarding the server with even more messages.

SUMMARY OF THE SOLUTION

Embodiments of the invention solve the above and other related problems by implementing a message restriction process in a communication network. The message restriction process controls which Diameter messages may be transmitted from a Diameter client to a Diameter server, which clients are authorized to transmit Diameter messages, or other aspects of transmitting messages to the Diameter server. According to the embodiments provided herein, the Diameter server generates control information that defines which Diameter messages may be transmitted to the Diameter server. The Diameter server then transmits the control information to the Diameter clients. The Diameter clients then process the control information to determine which, if any, Diameter messages may be transmitted to the Diameter server. The Diameter clients thus police themselves based on the control information so that the Diameter server is not bombarded with unwanted messages. Advantageously, if the Diameter server encounters an overload condition, the Diameter server can control which messages it will receive until the overload condition ends.

One embodiment of the invention comprises a communication network operable to implement a message restriction process to control the transmission of Diameter messages. The communication network includes a Diameter server operable to serve a plurality of Diameter clients. The Diameter server includes a detection system and an instruction generating system. The detection system is operable to detect a triggering event for initiating a message restriction process, such as detecting an overload condition in the Diameter server. The instruction generating system is operable to generate control information responsive to detection of the triggering event that defines the Diameter messages that the Diameter clients are authorized to transmit during the message restriction process. The instruction generating system is further operable to generate a message restriction instruction that includes the control information, and to transmit the message restriction instruction to one or more of the Diameter clients to initiate the message restriction process based on the control information.

In another embodiment, a Diameter client is operable to receive the message restriction instruction, and to process the message restriction instruction to identify the control information. The Diameter client is further operable to control transmission of Diameter messages to the Diameter server based on the control information. For example, the Diameter client may identify a Diameter message intended for transmission to the Diameter server. The Diameter client then processes the control information to determine whether or not the Diameter message is authorized to be transmitted to the Diameter server. If the Diameter message is authorized, then the Diameter client transmits the Diameter message to the Diameter server. If the Diameter message is not authorized, then the Diameter client blocks the Diameter message or re-directs the message to another Diameter server.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
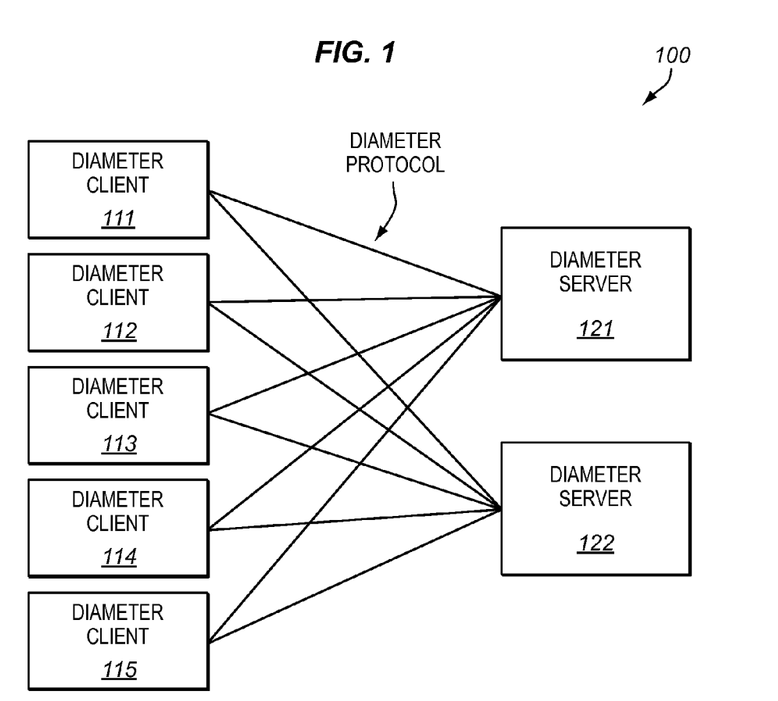
FIG. 1 illustrates a communication network in an exemplary embodiment of the invention.

FIG. 1 illustrates a communication network 100 in an exemplary embodiment of the invention. Communication network 100 includes a plurality of Diameter clients 111-115 connected to one or more Diameter servers 121-122. Clients 111-115 are each operable to communicate with servers 121-122 using Diameter protocol. Although Diameter is specifically referenced herein, the concepts described below may apply to other protocols.

Figure 2:
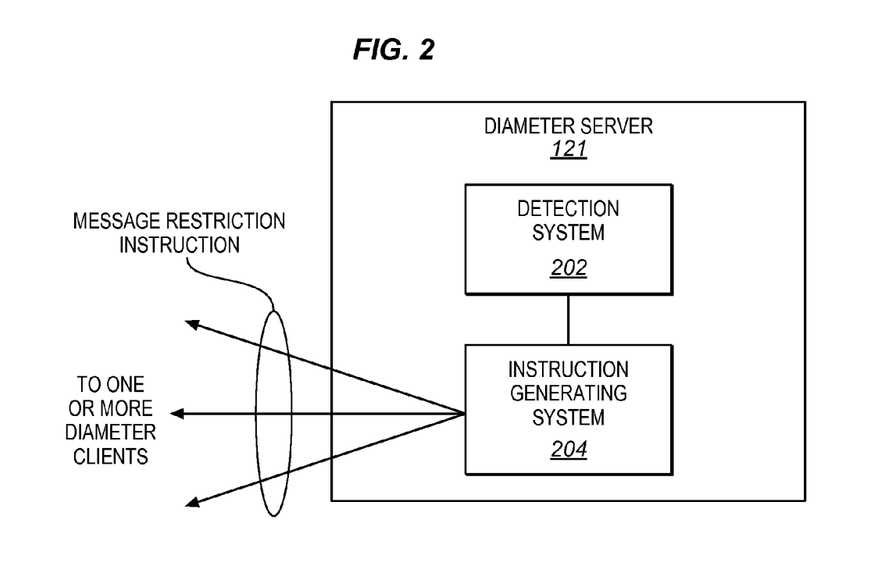
FIG. 2 is a block diagram illustrating a Diameter server in an exemplary embodiment of the invention.

FIG. 2 is a block diagram illustrating Diameter server 121 in an exemplary embodiment of the invention. Diameter server 121 includes a detection system 202 and an instruction generating system 204. Detection system 202 comprises any system, server, or function operable to detect a triggering event for initiating a message restriction process. For example, a triggering event may be the detection of an overload condition in Diameter server 121. In an overload condition, the volume of Diameter messages being received and processed by Diameter server 121 exceeds a threshold processing capacity of Diameter server 121. Thus, the detection of the overload condition may be the trigger to initiate the message restriction process. A message restriction process comprises any procedures, methods, or actions that limit or control the volume of Diameter messages that Diameter clients transmit to a Diameter server.

Instruction generating system 204 comprises any system, server, or function operable to generate control information that defines the Diameter messages that the Diameter clients are authorized to transmit during the message restriction process, and to generate and transmit a message restriction instruction that includes the control information. The message restriction instruction may be a message formatted according to the Diameter protocol. In such a format, one or more newly-defined AVPs may be included in the Diameter message. Some exemplary AVPs are described later in the specification and in FIGS. 5-6.

Figure 3:
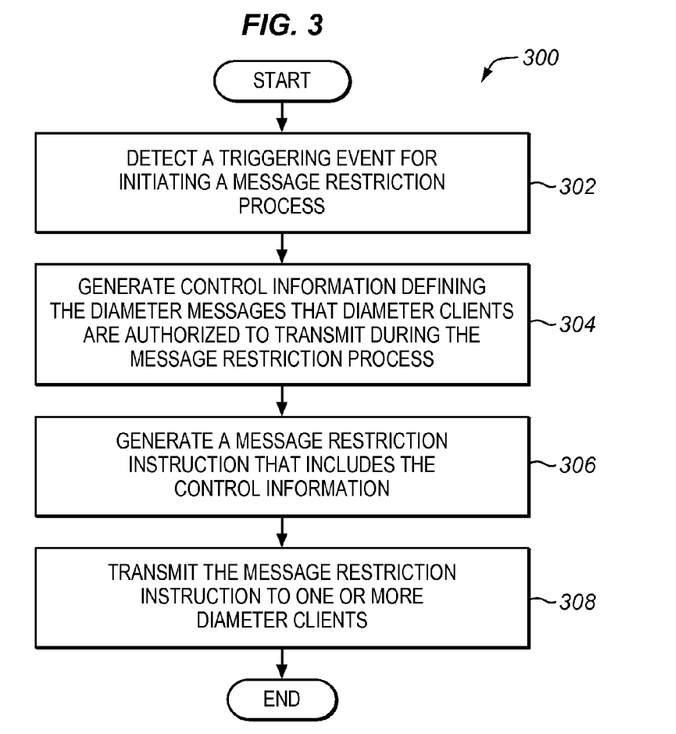
FIG. 3 is a flow chart illustrating a method of performing a message restriction process in an exemplary embodiment of the invention.

FIG. 3 is a flow chart illustrating a method 300 of performing a message restriction process in an exemplary embodiment of the invention. The steps of method 300 will be described with reference to communication network 100 in FIG. 1 and Diameter server 121 in FIG. 2, although the method may be performed by other types of communication networks and devices. The steps of the flow chart in FIG. 3 are not all inclusive and may include other steps not shown.

In step 302, detection system 202 detects a triggering event for initiating a message restriction process. One example of the triggering event is detection system 202 detecting an overload condition in Diameter server 121. In step 304, instruction generating system 204 generates control information responsive to detection of the triggering event. The control information comprises any data, rules, policies, or other data that defines the Diameter messages that Diameter clients 111-115 are authorized to transmit during the message restriction process. For example, instruction generating system 204 may determine what types of Diameter messages it is willing to receive, what types of Diameter clients may transmit these message, etc, in generating the control information. Instruction generating system 204 may determine that Diameter clients 111-115 are only allowed to transmit Accounting Request [END] messages, Session Termination Request messages, or other Diameter messages that indicate the end of a session or service during the message restriction process. Instruction generating system 204 may alternatively determine that only Diameter clients 111-115 that are roaming may transmit Diameter messages during the message restriction process.

In step 306, instruction generating system 204 generates a message restriction instruction that includes the control information. As previously mentioned, the message restriction instruction may be a message formatted according to the Diameter protocol and having one or more newly-defined AVPs that include the control information. In step 308, instruction generating system 204 transmits the message restriction instruction to one or more of the Diameter clients 111-115 to initiate the message restriction process based on the control information.

One or more of Diameter clients 111-115 receive the message restriction instruction from Diameter server 121. Each of the Diameter clients 111-115 that receive the message restriction instruction then process the message restriction instruction as described in FIG. 4 to determine which Diameter messages are authorized for transmission.

Figure 4:
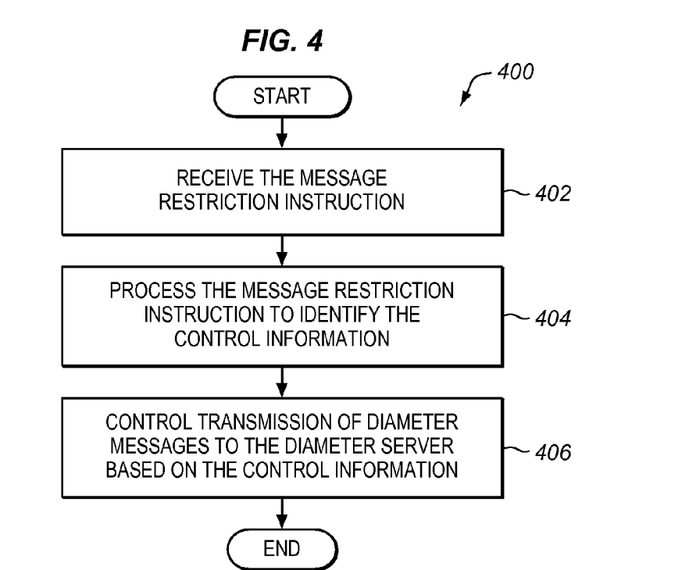
FIG. 4 is a flow chart illustrating a further method of performing a message restriction process in a Diameter client in an exemplary embodiment of the invention.

FIG. 4 is a flow chart illustrating a further method 400 of performing a message restriction process in a Diameter client in an exemplary embodiment of the invention. The steps of method 400 will be described with reference to communication network 100 in FIG. 1, although the method may be performed by other types of communication networks and devices. The steps of the flow chart in FIG. 4 are not all inclusive and may include other steps not shown.

In step 402, a Diameter client (assume Diameter client 111) receives the message restriction instruction. In step 404, Diameter client 111 processes the message restriction instruction to identify the control information included in the message restriction instruction. If the message restriction instruction is a Diameter message, then Diameter client 111 parses the AVPs in the message that include the control information. In step 406, Diameter client 111 controls transmission of Diameter messages to Diameter server 121 based on the control information. For example, assume that Diameter client 111 identifies a Diameter message intended for transmission to Diameter server 121. Before transmitting the Diameter message, Diameter client 111 processes the control information (i.e., the data, rules, and/or policies) to determine whether or not the Diameter message is authorized to be transmitted to Diameter server 121. If it is authorized, then Diameter client 111 transmits the Diameter message to Diameter server 121. If it is not authorized, then Diameter client 111 may block the Diameter message or may re-direct the message to another Diameter server, such as Diameter server 122.

The message restriction process as described above advantageously controls which Diameter messages are transmitted to Diameter server 121. By defining the control information, Diameter server 121 informs the Diameter clients 111-115 as to which Diameter messages are authorized for transmission. The Diameter clients 111-115 then police themselves using the control information so that only certain Diameters messages are transmitted to Diameter server 121. Diameter server 121 can thus handle overload conditions and other triggering events more efficiently.

Figure 5:
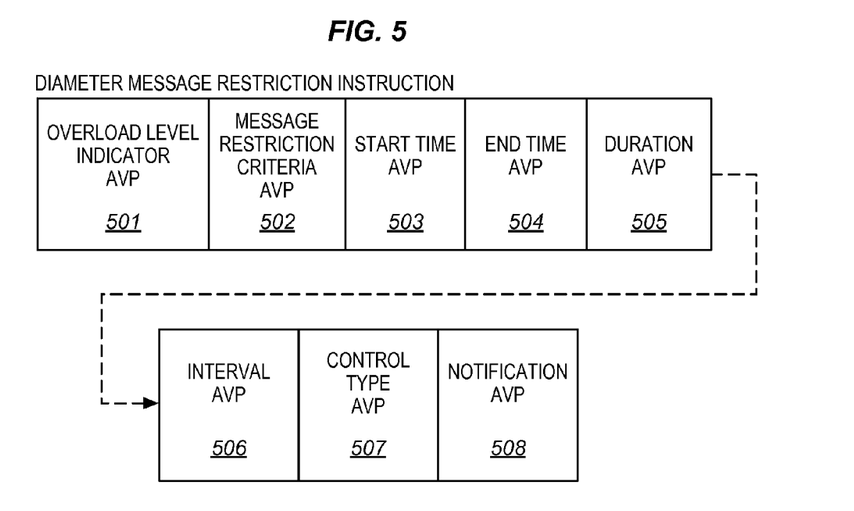
FIG. 5 is a block diagram illustrating a message restriction instruction in Diameter protocol in an exemplary embodiment of the invention.

In order to provide the control information in a Diameter message, one or more new AVPs may be defined in the Diameter message. FIG. 5 is a block diagram illustrating a message restriction instruction in Diameter protocol in an exemplary embodiment of the invention. The newly-defined AVPs shown in FIG. 5 include an overload level indicator AVP 501, a message restriction criteria AVP 502, a start time AVP 503, an end time AVP 504, a duration AVP 505, an interval AVP 506, a control type AVP 507, and a notification AVP 508. Any one or more of the above AVPs may be used in a message restriction instruction, along with other AVPs that are not specifically defined herein.

The overload level indicator AVP 501 indicates the overload level of Diameter server 121. Detection system 202, or another system in Diameter server 121, is able to determine a present processing level within Diameter server 121, and insert this level in overload level indicator AVP 501.

Figure 6:
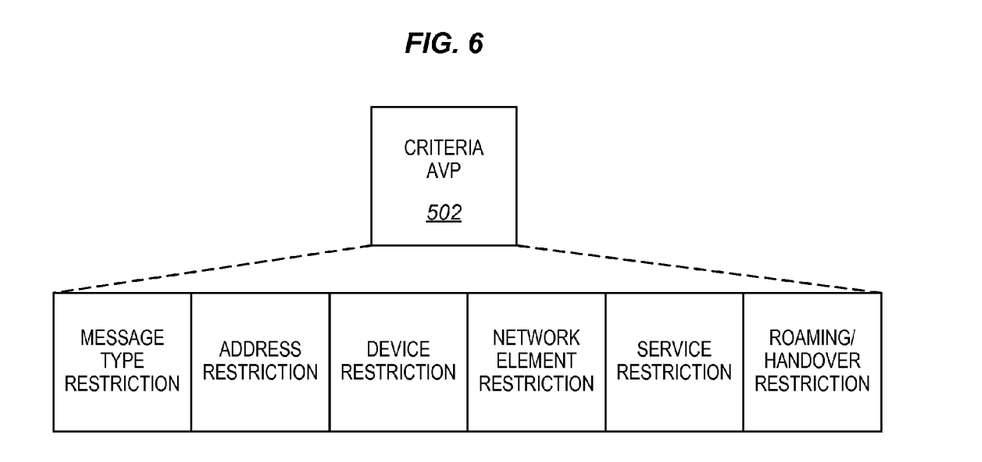
FIG. 6 is a block diagram illustrating criteria that may be included in a message restriction criteria AVP in an exemplary embodiment of the invention.

The message restriction criteria AVP 502 includes criteria for determining which messages are restricted from transmission, and which messages are authorized for transmission. The criteria may include any data, rules, or policies for determining which messages are restricted and which are authorized. For example, the criteria may include a rule that Accounting Request [INTERIM, END] messages are allowed, but Accounting Request [START] messages are not allowed. Further examples of the criteria are illustrated in FIG. 6.

The start time AVP 503, the end time AVP 504, and the duration AVP 505 indicate when to activate the message restriction process in the Diameter clients 111-115, when to deactivate the message restriction process in the Diameter clients 111-115, and the duration for performing the message restriction process. When the duration expires, the message restriction process will automatically stop.

The interval AVP 506 indicates a minimum window or time period during which particular message restriction criteria is applied to control transmission of Diameter messages to the Diameter server. For example, if the duration of the message restriction process is 12 hours, then one or more intervals (i.e., 20 minute intervals) may be defined during this duration. Each interval may have particular message restriction criteria defined for that interval, or may have the same criteria. That way, during the duration of the message restriction process, message restriction may be handled differently in different intervals. For example, peak times may be handled differently than non-peak times.

The control type AVP 507 indicates a reason for initiating the message restriction process. In one example, the reason may be that Diameter server 121 is overloaded. Another reason may be that the Diameter server 121 is temporary out of service or is being updated. Another reason may be that a network operator manually initiated the message restriction process.

The notification AVP 508 indicates the information to provide to a user, such as a calling party or a called party, notifying the user that the message restriction process has been activated. For example, a notification may say "Because of traffic congestion, this call cannot continue". The notification AVP 508 also indicates how the notification should be sent to the user, such as a text message, an email, a voice announcement, etc.

FIG. 6 is a block diagram illustrating criteria that may be included in a message restriction criteria AVP 502 as described above in an exemplary embodiment of the invention. One type of criteria may be message type restriction. In message type restriction, Diameter server 121 may generate criteria that restricts Diameter messages based on their type. For example, if Diameter server 121 is busy or overloaded, then it might not want any new Diameter threads to be started. Thus, Diameter server 121 may refuse any new threads by restricting all Request [START] messages, but allowing Request [INTERIM or STOP] messages.

Another type of criteria may be address restriction. In address restriction, Diameter server 121 may generate criteria that treats the calling or called party addresses and types differently. Message restriction may be applied to a single calling or called party directory number, IP address, public or private address, etc. Message restriction may also be applied to a range of directory numbers, IP addresses, etc.

Another type of criteria may be device restriction. In device restriction, Diameter server 121 may generate criteria that restricts the Diameter messages that are sent from particular types of devices (also referred to as UEs or handsets). For example, at a peak time, Diameter server 121 may only allow Diameter messages for sessions involving mobile phones, but block messages involving other types of devices.

Another type of criteria may be network element restriction. In network element restriction, Diameter server 121 may generate criteria that restricts the Diameter messages that are sent from particular types of network elements. For example, at a peak time, Diameter server 121 may only allow Diameter messages from Serving-Call Session Control Functions (S-CSCF) and Application Servers (AS), but block messages from other types of network elements.

Another type of criteria may be service restriction. In service restriction, Diameter server 121 may generate criteria that restricts messages depending on the type of service for, the message, such as voice, multimedia messages, etc. For example, Diameter server 121 may only allow Diameter online charging messages for multimedia messages, but block online charging messages for voice sessions.

Another type of criteria may be roaming/handover restriction. In roaming/handover restriction, Diameter server 121 may generate criteria that restricts or allows messages based on whether a user is roaming, whether the session was handed over from another network, etc.

Figure 7:
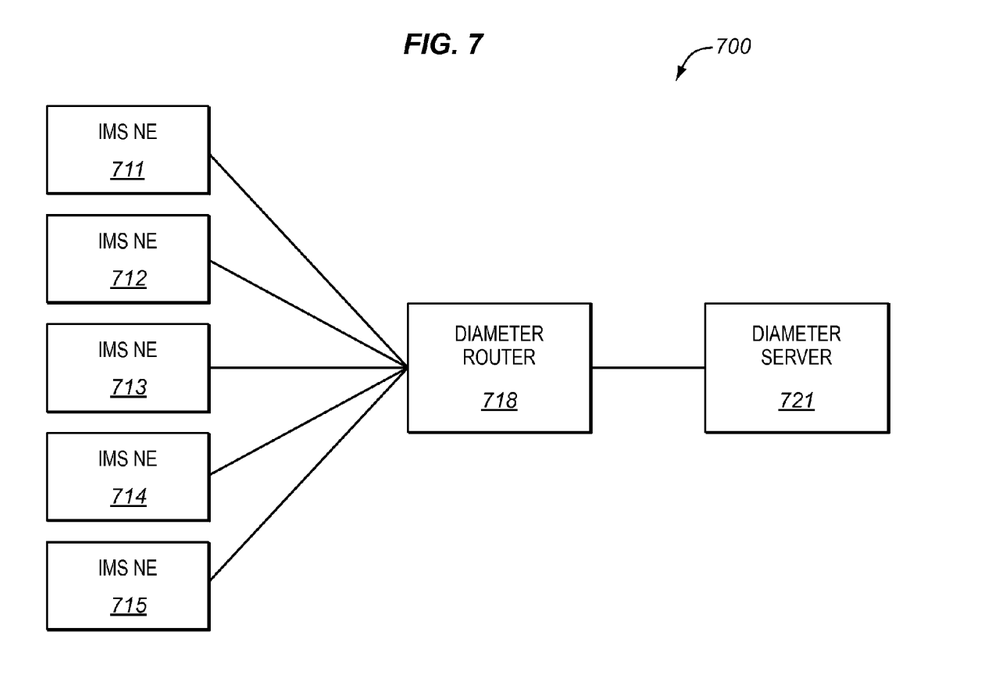
FIG. 7 illustrates an IMS network in an exemplary embodiment of the invention.

FIG. 7 illustrates an IMS network 700 in an exemplary embodiment of the invention. IMS network 700 includes a plurality of IMS network elements (NE) 711-715, a Diameter router 718, and a Diameter server 721. Network elements 711-715 are each operable to communicate with Diameter router 718 using Diameter protocol. Likewise, Diameter router 718 is operable to communicate with Diameter server 721 using Diameter protocol. Some examples of network elements 711-715 are S-CSCFs, application servers, etc, in the IMS network 700. Some examples of Diameter server 721 are an offline charging system (e.g., Charging Data Function (CDF)) and an online charging system. In this embodiment, Diameter router 718 acts as a Diameter client to provide the message restriction process.

Figure 8:
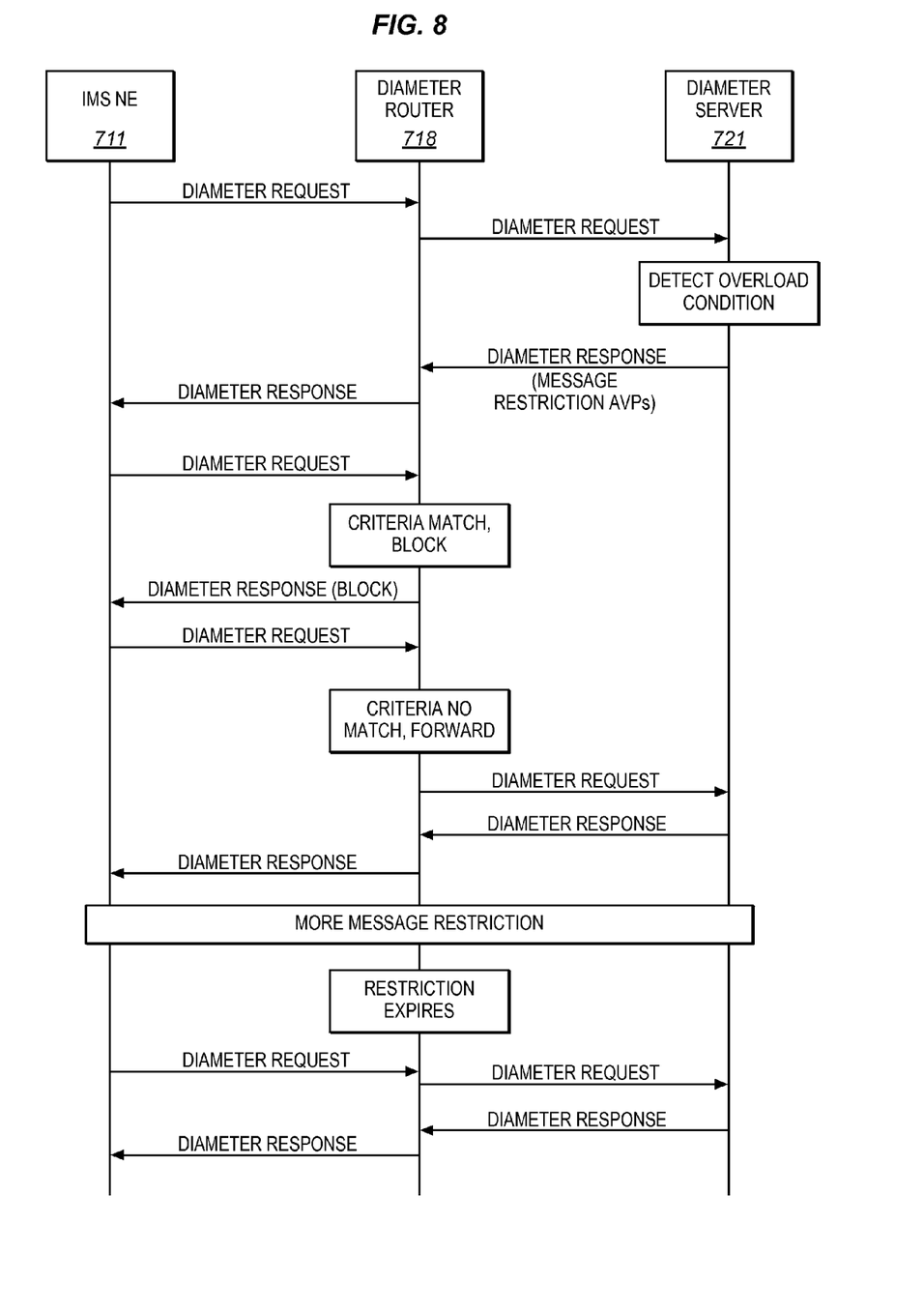
FIG. 8 is a message diagram illustrating an example of performing a message restriction process in an exemplary embodiment of the invention.

FIG. 8 is a message diagram illustrating an example of performing a message restriction process in an exemplary embodiment of the invention. When in operation, network element 711 transmits a Diameter Request message to Diameter router 718. The Diameter Request message may comprise an Accounting Request (ACR) message for offline charging, a Credit Control Request (CCR) message for online charging, or another type of message. Diameter router 718 then forwards the Diameter Request message to Diameter server 721. Assume that Diameter server 721 is experiencing an overload condition. Diameter server 721 thus detects the overload condition, and initiates the message restriction process. Diameter server 721 thus generates control information that defines the Diameter messages that Diameter router 718 is authorized to transmit during the message restriction process. Diameter server 721 generates a Diameter Response message that includes newly-defined message restriction AVPs, such as is illustrated in FIG. 5. Diameter server 721 inserts the control information in the appropriate AVPs of the Diameter Response message, and transmits the Response message to Diameter router 718.

Diameter router 718 processes the Response message to identify the control information provided by Diameter server 721. The control information indicates what Diameter messages are authorized for transmission to Diameter server 721 during the message restriction process, when to activate the message restriction process, how long to activate the message restriction process, etc. Diameter router 718 then transmits a Diameter Response message to network element 711.

At a later time, network element 711 transmits another Diameter Request message to Diameter router 718. Because message restriction has been activated, Diameter router 718 processes the control information to determine if the Request message is allowed to be transmitted to Diameter server 721. If the Request message matches the restriction criteria provided in the control information, then Diameter router 718 blocks the Request message and transmits a Diameter Response message to network element 711 indicating that the Request message was blocked.

At another later time, network element 711 transmits yet another Diameter Request message to Diameter router 718. Because message restriction has been activated, Diameter router 718 again processes the control information to determine if the Request message is allowed to be transmitted to Diameter server 721. If the Request message does not match the restriction criteria provided in the control information, then Diameter router 718 transmits the Diameter Request message to Diameter server 721. Diameter server 721 processes the Request message in a normal fashion, and returns a Diameter Response message. Diameter router 718 then forwards the Diameter Response message to network element 711.

The message restriction process continues in this fashion until the duration defined for the message restriction process is reached. When the duration has been reached, Diameter router 718 deactivates the message restriction process. Thus, if network element 711 transmits another Diameter Request message to Diameter router 718, then Diameter router 718 forwards the Diameter Request message to Diameter server 721 without having to process the control information. Diameter server 721 processes the Request message in a normal fashion, and returns a Diameter Response message. Diameter router 718 then forwards the Diameter Response message to network element 711. If another triggering event is detected in Diameter server 721, then Diameter server 721 may again initiate the message restriction process to block certain messages from Diameter router 718.

Although specific embodiments were described herein, the scope of the invention is not limited to those specific embodiments. The scope of the invention is defined by the following claims and any equivalents thereof.

We claim:

1. A system comprising:
a Diameter server configured to serve a plurality of Diameter clients;
the Diameter server detects a triggering event for initiating a message restriction process, generates control information responsive to detection of the triggering event defining that a Diameter client is authorized to transmit Diameter STOP messages to the Diameter server during the message restriction process and is not authorized to transmit Diameter START messages to the Diameter server during the message restriction process, generates a message restriction instruction that includes the control information, and transmits the message restriction instruction to the Diameter client to initiate the message restriction process based on the control information.

2. The system of claim 1 further comprising:
the Diameter client receives the message restriction instruction, processes the message restriction instruction to identify the control information, and controls transmission of Diameter messages to the Diameter server on a per-message basis based on the control information.

3. The system of claim 1 wherein the message restriction instruction includes an overload level indicator Attribute Value Pair (AVP) indicating an overload level within the Diameter server.

4. The system of claim 1 wherein the message restriction instruction includes a message restriction criteria Attribute Value Pair (AVP) indicating policies defining that the Diameter STOP messages are authorized and that Diameter START messages are not authorized.

5. The system of claim 1 wherein the message restriction instruction includes a start time Attribute Value Pair (AVP), a stop time AVP, and a duration AVP indicating when the Diameter client should activate the message restriction process and deactivate the message restriction process.

6. The system of claim 1 wherein the message restriction instruction includes an interval Attribute Value Pair (AVP) indicating a time period during which the Diameter clients are instructed to control transmission of Diameter messages to the Diameter server based on the control information.

7. The system of claim 1 wherein the message restriction instruction includes a restriction control type Attribute Value Pair (AVP) indicating a reason for initiating the message restriction process.

8. The system of claim 1 wherein the message restriction instruction includes a notification Attribute Value Pair (AVP) indicating a notification to be sent to a user informing the user of the message restriction process.

9. A method of implementing a message restriction process in a communication network having a Diameter server operable to serve a plurality of Diameter clients, the method comprising:
detecting, in the Diameter server, a triggering event for initiating the message restriction process;
generating control information responsive to detection of the triggering event defining that a Diameter client is authorized to transmit Diameter STOP messages to the Diameter server during the message restriction process and is not authorized to transmit Diameter START messages to the Diameter server during the message restriction process;
generating a message restriction instruction that includes the control information; and
transmitting the message restriction instruction to the Diameter client to initiate the message restriction process based on the control information.

10. The method of claim 9 further comprising:
receiving, in the Diameter client, the message restriction instruction;
processing the message restriction instruction to identify the control information; and
controlling transmission of Diameter messages to the Diameter server on a per-message basis based on the control information.

11. The method of claim 9 wherein the message restriction instruction includes an overload level indicator Attribute Value Pair (AVP) indicating an overload level within the Diameter server.

12. The method of claim wherein the message restriction instruction includes a message restriction criteria Attribute Value Pair (AVP) indicating policies defining that the Diameter STOP messages are authorized and that Diameter START messages are not authorized.

13. The method of claim 9 wherein the message restriction instruction includes a start time Attribute Value Pair (AVP), a stop time AVP, and a duration AVP indicating when the Diameter client should activate the message restriction process and deactivate the message restriction process.

14. The method of claim 9 wherein the message restriction instruction includes an interval Attribute Value Pair (AVP) indicating a time period during which the Diameter clients are instructed to control transmission of Diameter messages to the Diameter server based on the control information.

15. The method of claim 9 wherein the message restriction instruction includes a restriction control type Attribute Value Pair (AVP) indicating a reason for initiating the message restriction process.

16. The method of claim 9 wherein the message restriction instruction includes a notification Attribute Value Pair (AVP) indicating a notification to be sent to a user informing the user of the message restriction process.

* * * * *